US010550927B2

(12) United States Patent
Dunham et al.

(10) Patent No.: US 10,550,927 B2
(45) Date of Patent: Feb. 4, 2020

(54) MULTI-FUNCTION TRANSMISSION CROSSMEMBER

(71) Applicant: Ford Global Technologies, LLC, Dearborn, MI (US)

(72) Inventors: James William Dunham, Plymouth, MI (US); Kyle Mattinson, Taylor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 86 days.

(21) Appl. No.: 15/818,161

(22) Filed: Nov. 20, 2017

(65) Prior Publication Data

US 2019/0154132 A1 May 23, 2019

(51) Int. Cl.
*F16H 57/025* (2012.01)
*B62D 25/20* (2006.01)
*B62D 25/08* (2006.01)
*B62D 21/02* (2006.01)
*B60K 13/04* (2006.01)
*B62D 21/03* (2006.01)
*F01N 13/18* (2010.01)
*F16H 57/04* (2010.01)

(52) U.S. Cl.
CPC .......... *F16H 57/025* (2013.01); *B60K 13/04* (2013.01); *B62D 21/02* (2013.01); *B62D 21/03* (2013.01); *B62D 25/082* (2013.01); *B62D 25/20* (2013.01); *B62D 25/2018* (2013.01); *F01N 13/1822* (2013.01); *F16H 57/0416* (2013.01); *F16H 57/0452* (2013.01)

(58) Field of Classification Search
CPC ............... F16H 57/025; F16H 57/0416; F16H 57/0452; F01N 13/1822; B60K 13/04; B62D 25/20; B62D 25/082; B62D 25/2018; B62D 25/08; B62D 21/03; B62D 21/152; B62D 21/02
USPC ........ 180/312, 377, 69.1; 280/124.109, 781; 296/204, 193.07, 203.04
See application file for complete search history.

(56) References Cited

U.S. PATENT DOCUMENTS

| 6,588,832 | B2 | 7/2003 | Sakuma |
| 7,958,963 | B2 | 6/2011 | Hornisch et al. |
| 8,875,834 | B1 | 11/2014 | Sirbu et al. |
| 2003/0136602 | A1* | 7/2003 | Tsuda ............... B62D 49/06 180/312 |
| 2019/0106072 | A1* | 4/2019 | Uchiba ............... B60R 19/34 |

FOREIGN PATENT DOCUMENTS

| JP | 10095239 A | * | 4/1998 |
| JP | 2000073781 A | * | 3/2000 |

* cited by examiner

*Primary Examiner* — Keith J Frisby
(74) *Attorney, Agent, or Firm* — Vichit Chea; Brooks Kushman, P.C.

(57) ABSTRACT

A vehicle is provided. The vehicle may include a vehicle floor that defines a transmission tunnel and a crossmember. The crossmember may include a pair of longitudinal beams disposed along and sandwiching sled runners to the floor. Crossbeams may extend from and span between the pair to define an inner periphery that extends below and surrounds an outer periphery of an oil pan. One or more of the crossbeams may cap a tunnel that is defined by the floor.

16 Claims, 4 Drawing Sheets

MULTI-FUNCTION TRANSMISSION CROSSMEMBER

TECHNICAL FIELD

The present disclosure relates to structural frame members for a vehicle, particularly to a frame member for supporting a transmission and stiffening a transmission tunnel formed by the vehicle floor.

BACKGROUND

Motor vehicles with a front mounted engine and transmission often include a frame or structural member for mounting the engine and transmission. The transmission may be supported by a crossmember or structure that extends across the vehicle frame or body between two frame rails or sled runners (usually extending in a longitudinal direction). Various components may be attached to the crossmember or vehicle underbody: A skid plate or protective plate may be attached to the crossmember, vehicle frame, or body structure to protect components susceptible to contacting the ground and breaking. Skid plates are particularly useful for vehicles with a relatively low ride height (the distance between the ground and the vehicle's lower extremities), a common issue for sport cars. Additional structural members may also be required to meet crash worthiness requirements.

Additionally, a hanger or hook may be attached to the crossmember or vehicle frame used to hold or hang an exhaust pipe. As another example, an air scoop used to direct air towards the transmission to cool the transmission may also be attached to the crossmember or vehicle frame.

SUMMARY

According to one embodiment of this disclosure, a vehicle including a frame, a transmission, a vehicle floor and a crossmember is provided. The frame may include longitudinally extending sled runners that are sandwiched between the crossmember and the vehicle floor. The vehicle floor may define a tunnel that partially surrounds the transmission. The transmission may include an oil pan that has an outer periphery that is surrounded by an inner periphery defined by the crossmember. The crossmember may include a pair of longitudinal beams, a front crossbeam, a middle crossbeam, and a rearward crossbeam that extend from and span between the pair to form a ladder structure. The ladder structure defines the inner periphery that surrounds the outer periphery of the oil pan and caps the tunnel.

According to another embodiment of this disclosure, a vehicle frame is provided. The frame may include a vehicle floor and a crossmember. The crossmember may include a pair of longitudinal beams that may be disposed along and sandwich sled runners to the floor. Crossbeams may extend from and span between the pair to define an inner periphery that extends below and surrounds an outer periphery of an oil pan. One or more of the crossbeams may cap a tunnel that is defined by the floor.

According to yet another embodiment of this disclosure, a vehicle is provided. The vehicle may include a vehicle floor that defines a transmission tunnel and a crossmember. The crossmember may include a pair of longitudinal beams disposed along and sandwiching sled runners to the floor. Crossbeams may extend from and span between the pair to define an inner periphery that extends below and surrounds an outer periphery of an oil pan. One or more of the crossbeams may cap a tunnel that is defined by the floor.

DETAILED DESCRIPTION

Figure 1A:
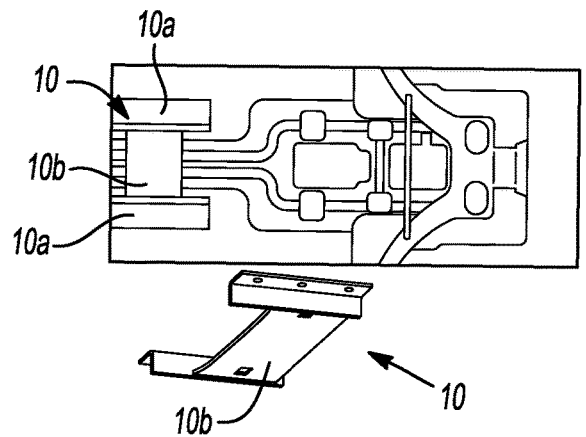
FIG. 1A-1E depicts the individual prior art components that the multi-function crossmember replaces.
Figure 1B:
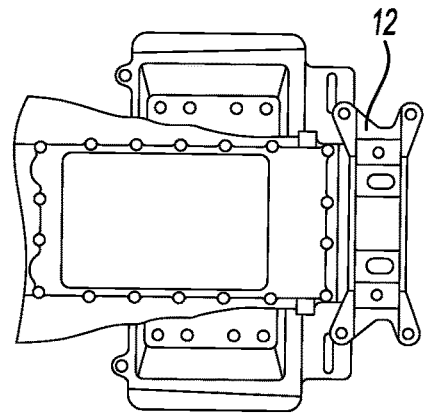
Figure 1C:
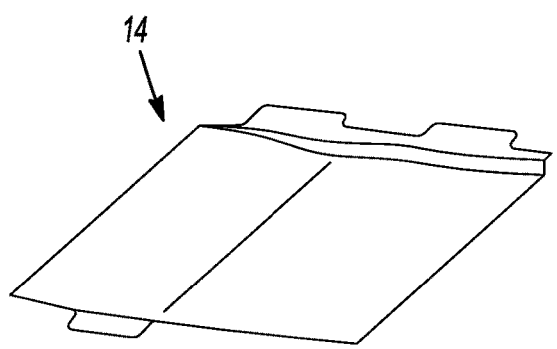
Figure 1D:
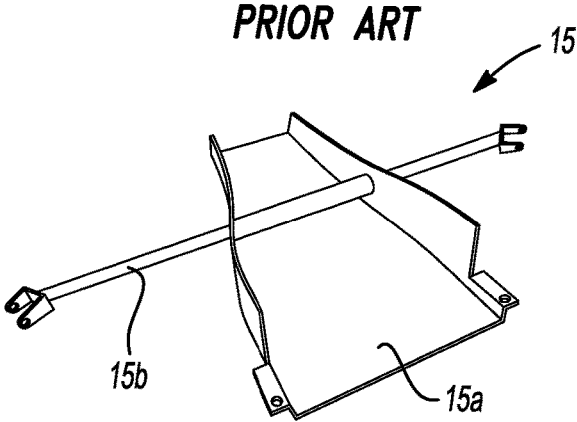
Figure 1E:
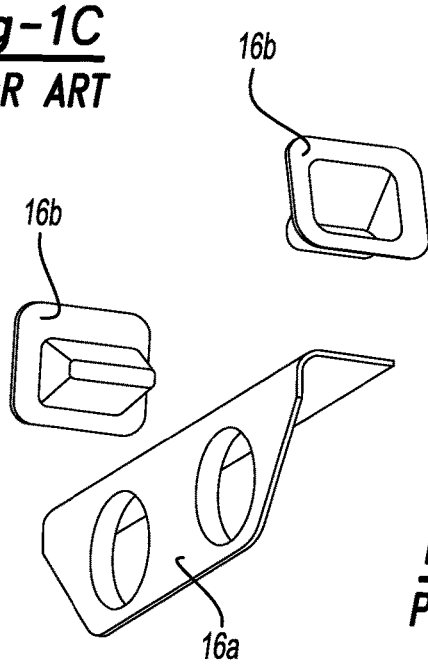

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Automobiles, particularly those with a front mounted engine and transmission include a frame or crossmember that supports the engine. Depending on the ground clearance, the distance between the lowest vulnerable component (transmission oil pan) and the ground, additional components (protective cover or skid plate) may be required. Additional structural components used to stiffen portions of the vehicle frame or floor (tunnel) may be added to meet crashworthiness requirements. In addition to the structural components (skid plate and tunnel reinforcement) mounting brackets for non-structural members (air scoop and/or exhaust hanger) may be necessitated. The use of several single components or sub-assemblies add complexity and cost to the vehicle.

A multi-function crossmember may be mounted to a portion of the vehicle frame (sled runners) to mitigate the additional parts mentioned above. The crossmember includes a pair of longitudinal beams that are disposed along the sled runners. The beams sandwich the sled runners to a portion of the floor. Crossbeams extend from and span between the pair of beams to define an inner periphery. The inner periphery extends below and surrounds an outer periphery of an oil pan. The inner periphery may extend below a bottom surface of the oil pan by at least 6 mm. One of the crossbeams also caps the tunnel that is defined by the floor. The oil pan may be for a transmission that is attached to the transmission case.

The crossbeams may include a front crossbeam, a rear crossbeam, and a middle crossbeam. The middle crossbeam and the rear crossbeam may define another or a second inner periphery. The second inner periphery may surround a rear portion of the transmission case. One or more of the crossbeams may serve as a mount or bracket for supporting or mounting a portion of the transmission. More specifically, the rear crossbeam may include a pocket that receives a portion of the transmission case. The rear crossbeam may extend across planar portions of the floor to cap the tunnel and provide structural stiffness to the tunnel in the cross-car or transverse direction. Moreover, the rear crossbeam may include an aperture or mounting hole for mounting an exhaust hanger. The exhaust hanger includes a hook that holds an exhaust pipe. The hook may be attached to a rubber isolator to mitigate vibration and noise due to movement of the exhaust pipe.

The crossmember and the longitudinal beams are integrally formed to one another. Meaning they are not separate pieces that are welded or fastened to one another. Rather the crossmember may be produced by casting, injection molding, or additive manufacturing (e.g., 3-D printing).

Referring to FIG. 1A-1E, various components eliminated by the multi-function crossmember are illustrated. A tunnel brace 10 that extends across two sections of the vehicle floor is shown in the upper left corner of the figure. The tunnel brace 10 includes two L-shaped brackets 10a that are connected by a planar bracket 10b. The tunnel brace is attached by multiple fasteners, e.g. rivets, screws, bolts, to the vehicle floor. A transmission crossmember 12 is shown to the right of the tunnel brace 10. The transmission crossmember 12 is a stamped bracket with four attachment ears that each receive a fastener. A skid plate 14 is shown to the right of the transmission crossmember 12. The skid plate 14 may be a metal stamping that is attached by fasteners to the underbody of the vehicle. An air cooling scoop 15 is illustrated below the tunnel brace. The air cooling scoop includes a scoop portion 15a and a mounting bracket 15b that may be attached to a portion of the vehicle underbody. Attachment members for an exhaust hanger are illustrated to the right of the air cooling scoop 15. The attachment members include a flange 16a and mounting members 16b. All of the above-mentioned components are eliminated by the multi-function crossmember 100.

Figure 2:
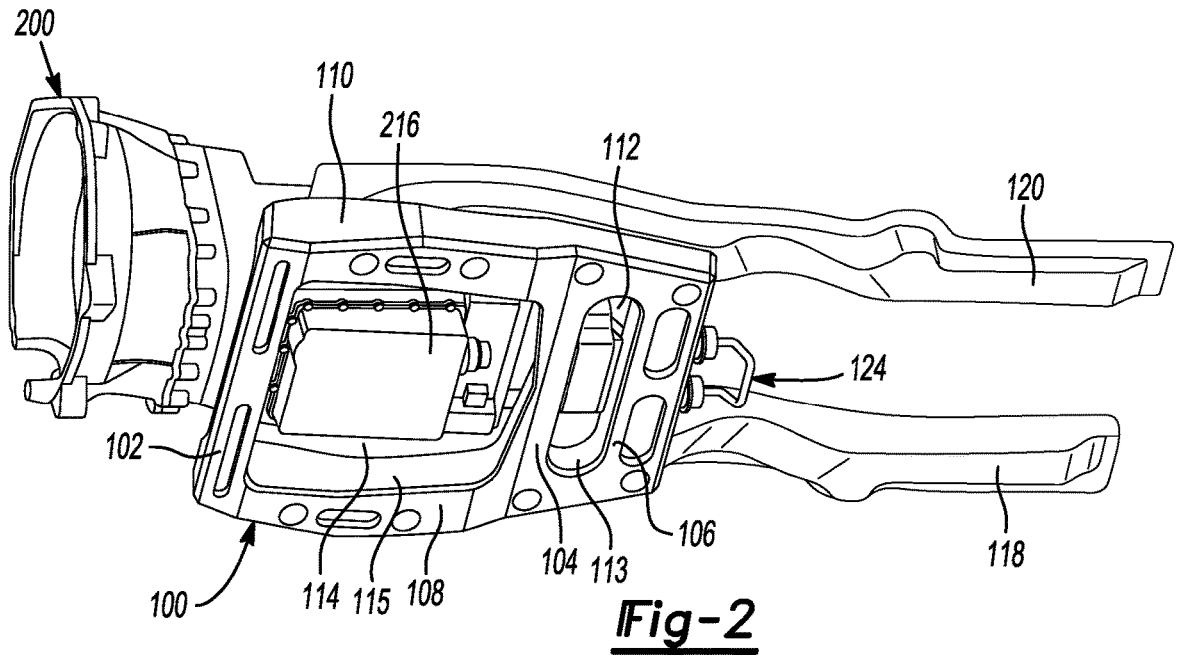
FIG. 2 is a bottom-perspective view of the multi-function crossmember, sled runners, and transmission.
Figure 3:
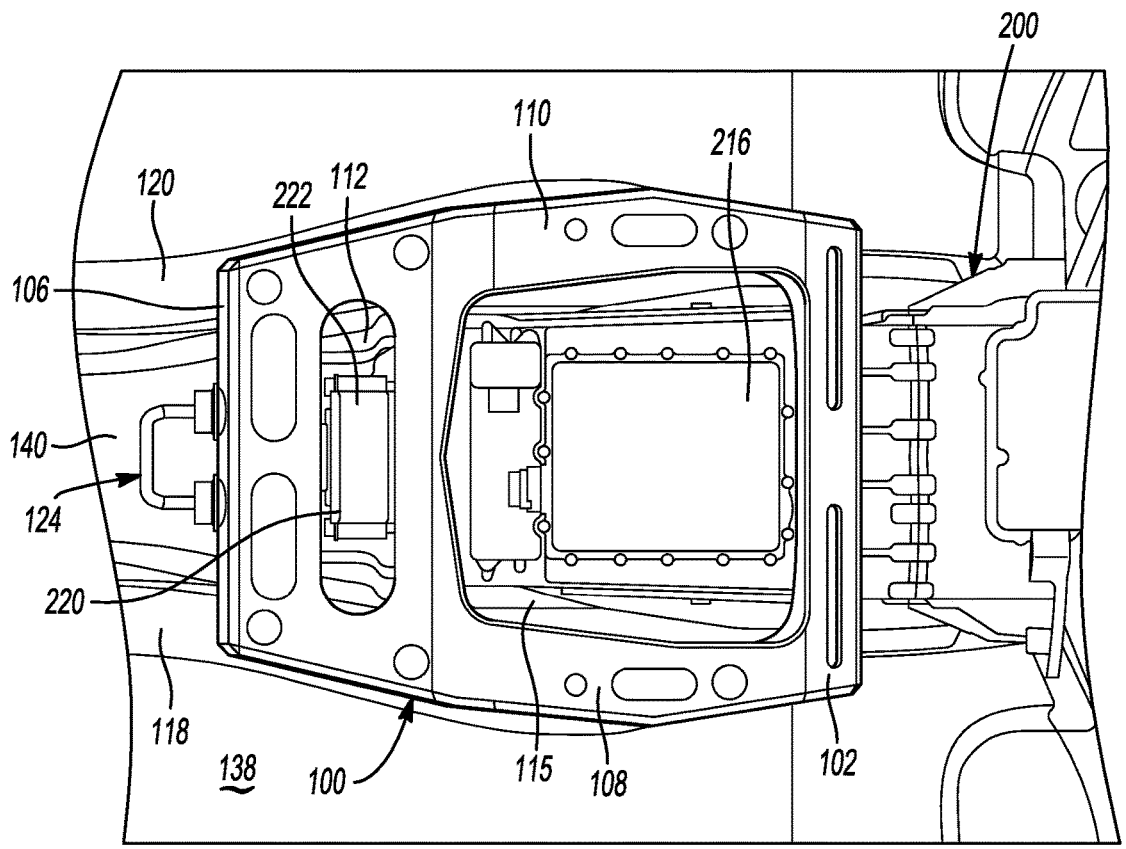
FIG. 3 is a bottom view of the multi-function crossmember, sled runners, and transmission.

Now referring to FIG. 2 and FIG. 3, the crossmember 100 attached to a pair of sled runners 118 and 120 is illustrated. The crossmember 100 includes a front crossbeam 102, a middle crossbeam 104, and a rear crossbeam 106 that each extend transversely. The crossmembers are integrally formed to a first longitudinal beam 108 and a second longitudinal beam 110. A transmission oil pan aperture 114 is defined by the longitudinal beams and the front crossbeams 102 and the middle crossbeam 104. The middle crossbeam 104 and the rear crossbeam, in combination with the longitudinal beams 108 and 110, define a transmission mount slot 112.

The transmission mount slot 112 is sized to receive a transmission mount 220. The transmission mount 220 may be defined by a rear portion of the transmission 200. The transmission mount 220 may be encased or include a rubber member 222 that lies along the rear portion of the transmission 200. The transmission mount 220 is received by the slot 112 so the rear crossmember 106 and middle crossmember supports the transmission 200.

The front inner periphery 115 is sized to surround the oil pan 216 of the transmission 200 so the periphery of the transmission oil pan 216 is protected or shielded from debris or uneven road surfaces. The bottom surface of the crossmember 100 is positioned below the bottom surface of the oil pan 216 so that the bottom surface of the crossmember 100, not the bottom surface of the oil pan 216, contacts the ground under certain conditions. The entirety of the bottom surface need not extend below the bottom surface of the oil pan 216. Rather, portions that surrounds the oil pan 216 or any other transmission component must extend below those components. The rear inner periphery 113 and the front inner periphery 115 are shown extending through the thickness of the crossmember 100. In other embodiments, they may instead be defined by a cavity or a pocket.

The crossmember 100 may be attached to longitudinal frame members that form part of the vehicle frame or chassis. Here, the crossmember 100 is attached to a pair of longitudinally extending sled runners 118 and 120 and sandwiches the end-portions of the tunnel (FIG. 3). Sled runners are structural members that are generally positioned between the outer most structural member (rocker arm) and the vehicle tunnel. The rear crossbeam 106 and the rear portions of the longitudinal beams 108 and 110 are disposed below and across the first sled runner 118 and the second sled runner 118. The rear crossbeam may also include an exhaust hanger assembly 124 that holds or braces an exhaust pipe (not shown).

The sled runners 118 and 120 bend outwardly toward the sides of the vehicle so that they are positioned adjacent to a rear portion of the transmission 200. It follows then that the crossmember 100 has a generally tapered shape so that it may be mounted to the sled runners 118 and 120. The front crossbeam 102 may be wider than the rear crossbeam 106 so the distance between the beams 108 and 110 may narrow or taper from the front to the rear. While the front portion of the crossmember 100 is depicted as being narrower than a rearward portion of the crossmember, it may have the same or greater width than the rearward portion.

The longitudinal beams 108 and 110 and the crossbeams 102, 104, and 106 may be of a tubular construction or hollow; made of top and bottom walls connected by sidewalls. In other embodiments, the structure may include structural foam to add additional stiffness. Additionally, the crossmember may be filled with a sound deadening foam to decrease vehicle vibration and noise. In yet another embodiment, the longitudinal beams 108 and 110 and the crossbeams 102, 104, and 106 may be solid (not hollow). If solid, the crossmember 100 may be made of a lightweight metal or alloy with sufficient structural rigidity to mount the transmission 200.

Figure 4:
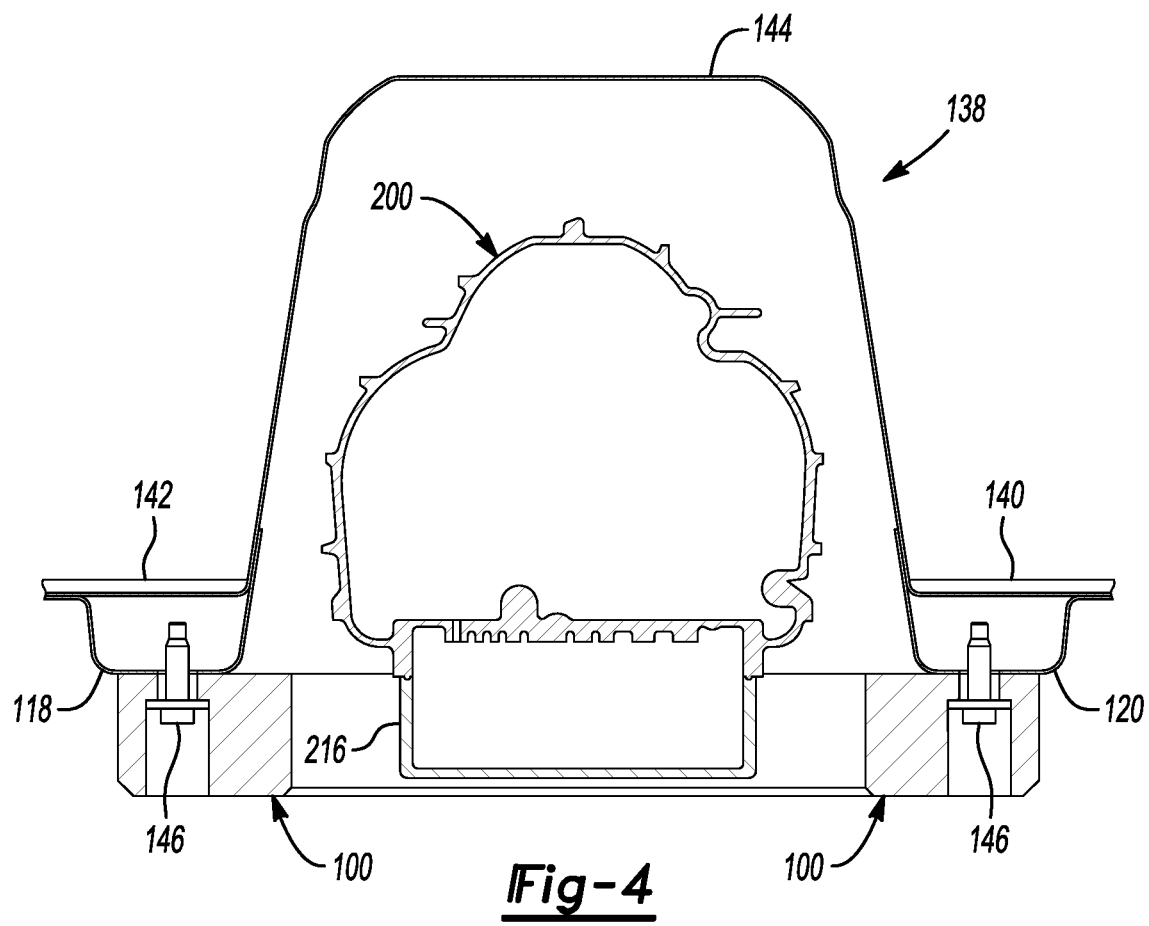
FIG. 4 is a cross-sectional view of the multi-function crossmember, sled runners, and vehicle floor.

Now referring to FIG. 4, a cross-sectional view of the multi-function crossmember 100, sled runners 118 and 120, and vehicle floor 138 is illustrated. The vehicle floor 138 includes two planar floor panels 140 and 142 that are connected to one another by a tunnel 144. The tunnel is sized to receive a rear portion of the transmission 200 (FIG. 2). One sitting within the interior of vehicle cabin would recognize the tunnel 144 as the humped or raised center portion of the vehicle floor 138. The floor may include a stationary fastener 146, e.g., weld nut or clinch nut. In other embodiments, the stationary fastener 146 may be attached to the sled runners 118 and 120, instead of the floor. A fastener, e.g., bolt or screw, may be fastened to the stationary fastener 146 after passing through holes within the crossmember 100 and each of the sled runners 118 and 120. In other embodiments, the stationary fastener 146 may be attached to sled runners 118 and 120. The rear crossbeam 106 caps or encloses the tunnel 144 by connecting the two planar floor panels 140 and 142 to one another. Because a portion of the tunnel 144 is enclosed by the rear crossbeam 106, the tunnel has more rigidity in the cross-car or transverse direction than it would without the rear crossbeam 106.

Figure 5:
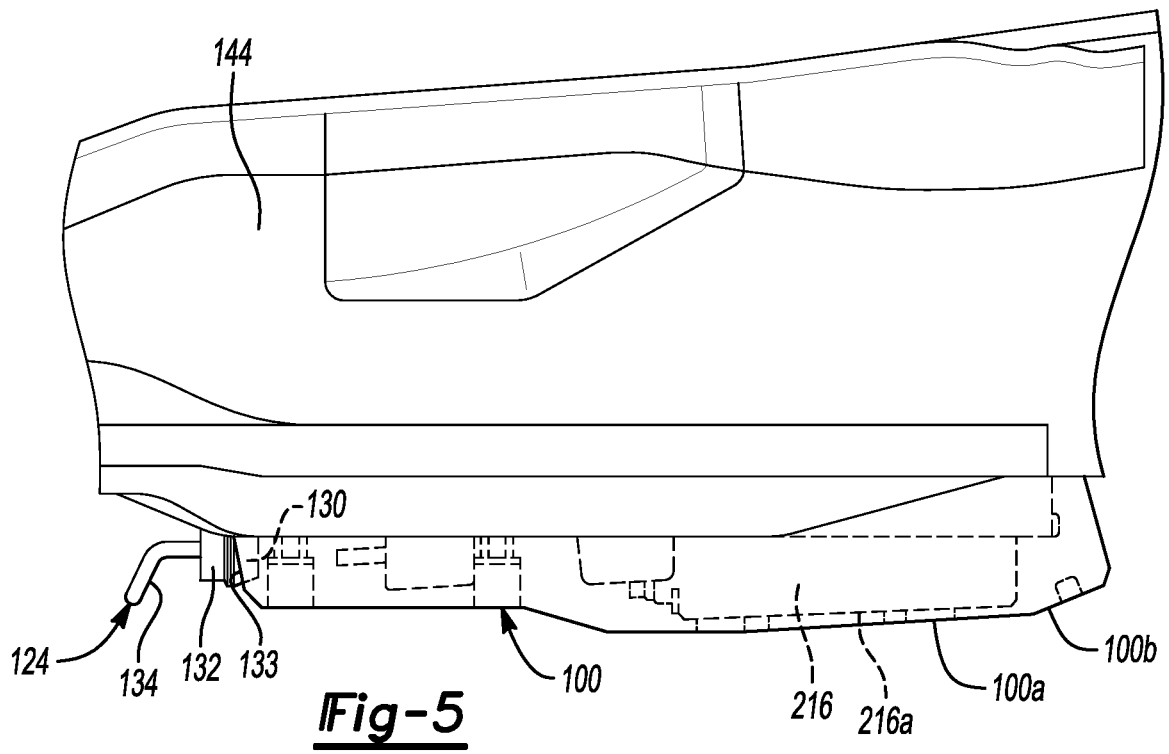
FIG. 5 is a side view of the multi-function crossmember, sled runners, and transmission tunnel.

Now referring to FIG. 5, a sideview of a side view of the multi-function crossmember, sled runners, and transmission tunnel is illustrated. The transmission oil pan 216 is represented by dashed lines as it is surrounded by the inner periphery of the crossmember 100. The crossmember 100 has a bottom surface 100a that extends below a bottom surface 216a of the oil pan 216. A front portion of the crossmember 100 includes an inclined portion 100b that is angled away from the bottom surface 100a of the crossmember 100. The incline portion reduces the cross-sectional area that is perpendicular to the direction to the direction of travel. The reduced cross-sectional area may decrease aerodynamic drag or wind resistance as the vehicle travels.

The exhaust hanger assembly 124 is attached to an aperture 133 formed by the crossmember 100. The hanger assembly 124 includes a hook 134 that receives or supports an exhaust pipe (not shown) that is threaded into a nut or fastener 132 and a rubber isolator 130. The rubber isolator may reduce vibration and associated noise of the exhaust pipe. While the hanger assembly 124 shown is attached to the rear crossbeam 106 of the crossmember 100, it may be attached in any suitable location on the crossmember 100.

Figure 6:
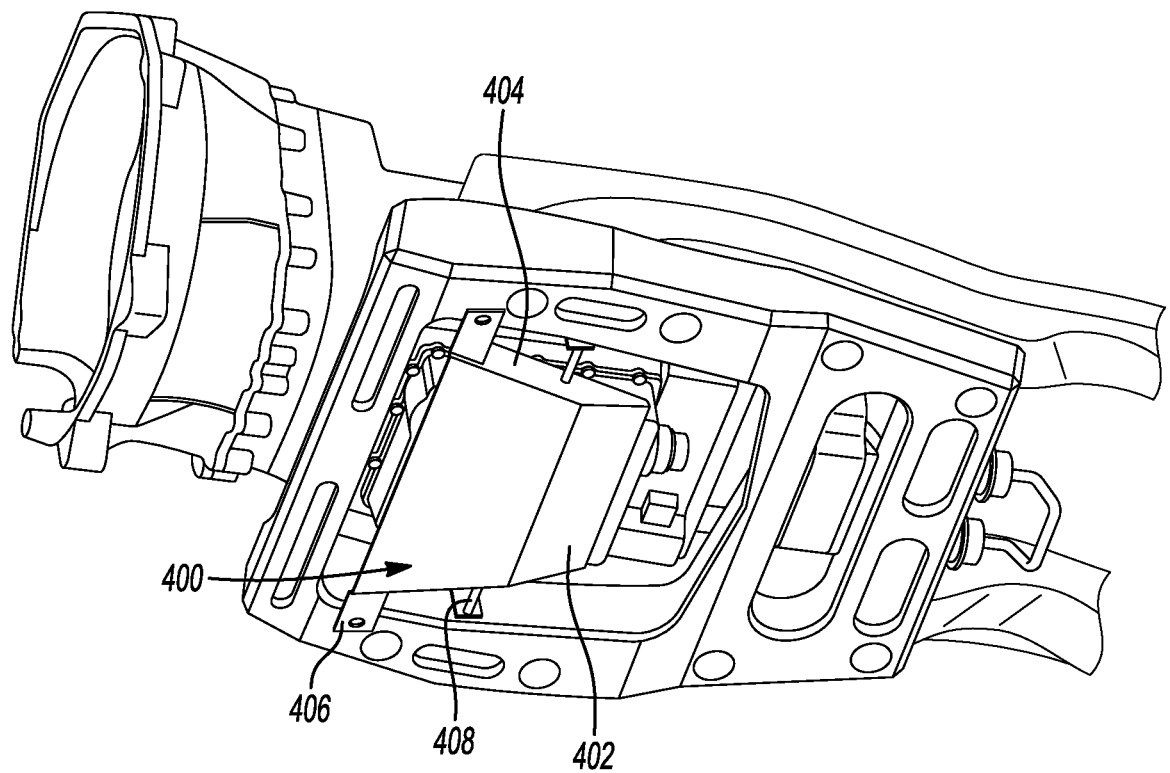
FIG. 6 is a bottom-perspective view of the multi-function crossmember including an air cooling scoop, sled runners, and transmission.

Now referring to FIG. 6, a bottom-perspective view of the multi-function crossmember 100 including an air cooling scoop 400, sled runners 118 and 120, and transmission 200, is illustrated. In certain applications, it may be desirable to direct air towards the transmission oil pan 216 or transmission 200 in general to cool those cool those components. It follows then an air scoop 400 may be attached or integrally formed with the crossmember 100 so that it directs air towards the oil pan 216 and transmission 200. The air scoop assembly 400 includes a planar bottom member 402 that is attached to a pair of sidewalls 404 (only one sidewall is illustrated). One or more planar mounts 406 may be attached to the bottom member for attaching to the crossmember 100. The air scoop assembly 400 may include a cross brace 408 extending between the longitudinal beams 108 and 110 to mount the air scoop 400. In other embodiments, the cross brace 408 may not be required. Rather, the sidewalls 404 may be integrally formed with the longitudinal beams 108 and 110.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a frame including longitudinally extending sled runners;
a transmission including an oil pan;
a vehicle floor defining a tunnel that partially surrounds a rear portion of the transmission; and
a crossmember including a pair of longitudinal beams connected to the sled runners, a front crossbeam, a middle crossbeam, and a rear crossbeam extending from and spanning between the pair to form a ladder structure defining an inner periphery that extends below and surrounds an outer periphery of the oil pan and caps the tunnel.

2. The vehicle of claim 1, wherein the pair of longitudinal beams are disposed along and sandwich the sled runners to the floor.

3. The vehicle of claim 1, wherein the rear crossbeam supports a rear portion of the transmission.

4. The vehicle of claim 1, wherein the rear crossbeam includes a rear wall that defines at least one aperture that receives an exhaust hanger.

5. A vehicle frame comprising:
a vehicle floor; and
a crossmember including a pair of longitudinal beams disposed along and connected to sled runners attached to the floor, and crossbeams extending from and spanning between the pair to define an inner periphery that extends below and surrounds an outer periphery of an oil pan and caps a tunnel defined by the floor.

6. The vehicle frame of claim 5, wherein the oil pan is a transmission oil pan that is connected to a transmission case.

7. The vehicle frame of claim 5, wherein the crossbeams include a front cross beam, a middle crossbeam, and a rear crossbeam, the middle crossbeam and the rear crossbeam extending from and spanning between the pair of longitudinal beams to define a second inner periphery that surrounds a transmission mount.

8. The vehicle frame of claim 7, wherein a tunnel defined by the vehicle floor includes a pair of planar floor panels and an arch extending therebetween and sized to accommodate a rear portion of a transmission.

9. The vehicle frame of claim 8, wherein the rear crossbeam includes a rear wall that defines at least one aperture that receives an exhaust hanger.

10. The vehicle frame of claim 9, further comprising:
an air cooling scoop including a planar bottom base extending from and between a pair of sidewalls; and
an elongated mounting bracket attached to the scoop configured to be attached to the pair of longitudinal beams.

11. A vehicle comprising:
a vehicle floor defining a transmission tunnel; and
a crossmember including a pair of longitudinal beams disposed and attached to sled runners attached to the floor, and crossbeams extending from and spanning between the pair to define an inner periphery that extends below and surrounds an outer periphery of an oil pan and caps the transmission tunnel.

12. The vehicle of claim 11, wherein the crossmember is made of a single piece of material.

13. The vehicle of claim 11, wherein the crossbeams include an anterior crossbeam, a medial crossbeam, and a posterior crossbeam, wherein the anterior crossbeam is angled along an incline with respect to a bottom surface of the longitudinal beam to reduce aerodynamic drag.

14. The vehicle of claim 13, wherein the posterior crossbeam and each of the sled runners define a set of throughholes each configured to receive a bolt so that the sled runners are sandwiched between the crossmember and the vehicle floor.

15. The vehicle of claim 13, wherein the posterior crossbeam includes a rear wall that defines at least one aperture that receives an exhaust hanger.

16. The vehicle of claim 13, wherein the inner periphery extends at least 6 mm below a bottom surface of the oil pan.

* * * * *